(12) United States Patent
Burhenne et al.

(10) Patent No.: US 6,952,066 B2
(45) Date of Patent: Oct. 4, 2005

(54) CONNECTING ELEMENT FOR AN ELECTRIC MOTOR

(75) Inventors: Sabine Burhenne, Bretten (DE); Thomas Schmidt, Hauneck (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/681,461

(22) Filed: Oct. 6, 2003

(65) Prior Publication Data

US 2004/0115961 A1 Jun. 17, 2004

(30) Foreign Application Priority Data

Oct. 21, 2002  (DE) .......................................... 102 48 977

(51) Int. Cl.[7] ................................................. H02K 5/14
(52) U.S. Cl. .......................................... 310/239; 310/71
(58) Field of Search ........................... 310/71, 87, 242, 310/245, 246–247, 238, 239

(56) References Cited

U.S. PATENT DOCUMENTS

| | | | | |
|---|---|---|---|---|
| 4,266,155 A | * | 5/1981 | Niemela | ..................... 310/239 |
| 4,340,832 A | * | 7/1982 | Cheetham et al. | ........... 310/239 |
| 5,081,386 A | * | 1/1992 | Iwai | ............................. 310/87 |
| 5,131,822 A | * | 7/1992 | Yamamoto et al. | ....... 417/423.7 |
| 5,345,124 A | * | 9/1994 | Lang | ............................ 310/51 |
| 5,563,467 A | * | 10/1996 | Csermak et al. | ............. 310/239 |
| 5,717,271 A | * | 2/1998 | Aoki et al. | .................. 310/242 |
| 5,949,175 A | * | 9/1999 | Cummins | .................... 310/239 |

FOREIGN PATENT DOCUMENTS

DE       10120198      * 10/2002  ............ H02K/5/15

* cited by examiner

*Primary Examiner*—Burton Mullins
(74) *Attorney, Agent, or Firm*—Richard A. Speer; Mayer, Brown, Rowe & Maw LLP

(57) ABSTRACT

A connecting element (4) for an electric motor (1) of a fuel feed unit of a motor vehicle has a molded component (7) which is fabricated in one piece with a connecting contact (6) and a guide for a carbon brush. The molded component (7) is fabricated from sheet metal and can be inserted in a premounted form into a receptacle (8) of the connecting element (4).

6 Claims, 2 Drawing Sheets

US 6,952,066 B2

CONNECTING ELEMENT FOR AN ELECTRIC MOTOR

BACKGROUND OF THE INVENTION

The invention relates to a connecting element for an electric motor, in particular for an electric motor of a fuel feed unit of a motor vehicle, having connecting contacts for connecting the electric motor to a power source and to the carbon brushes of the electric motor, a molded component which has at least one of the connecting contacts being arranged in a receptacle.

Such connecting contacts are frequently used to connect electric motors in feed units of fuel containers in contemporary motor vehicles and are known from practice. Here, the connecting contacts are each punched out of a piece of sheet metal and soldered to electronic components, such as a capacitor or reactor, and a connecting line for the carbon brush. The connecting contacts are then usually connected to a plastic part. During the mounting operation, the plastic part is attached to the electric motor, and the carbon brushes are inserted into guides of the electric motor. A disadvantage of the known connecting element is that it is very complex, and thus cost-intensive, to mount.

BRIEF SUMMARY OF THE INVENTION

The invention is based on the problem of configuring a connecting element of the type mentioned at the beginning in such a way that it can be mounted on the electric motor particularly easily.

This problem is solved according to the invention in that the molded component forms a premountable structural unit with a guide for the carbon brush.

This configuration enables all the essential components which are necessary to supply the electric motor with electric current to be arranged and premounted on the molded component. When the connecting element according to the invention is mounted on the electric motor, the molded component is connected to the other components of the electric motor. In the process, the carbon brush runs up against a rotor of the electric motor. As a result, the connecting element according to the invention can be mounted on the electric motor in a particularly easy and thus cost-effective manner. In the most favorable case, an electrically conductive design of the molded component makes it possible to make contact with the carbon brush without further electrical lines.

The connecting element according to the invention is of particularly simple structural design if the molded component is fabricated in one piece with one of the connecting contacts. This configuration permits molded components to be inserted in pairs into receptacles in the connecting element according to the invention.

The molded component could be fabricated, for example, from electrically conducting plastic. In order to reduce the fabrication costs of the connecting element according to the invention further it is beneficial if the molded component is fabricated from sheet metal, preferably from sheet steel.

Solder points for connecting the connecting contacts to electronic components, frequently lead to failures in the known connecting element when the element is wetted with solvents such as fuel. According to another advantageous development of the invention, such failures can advantageously be avoided if the molded component has a clip for clamping the connecting lines of electronic components and/or the carbon brush. This configuration also leads to a reduction in the fabrication costs of the connecting element according to the invention.

According to another advantageous development of the invention, the clamp for clamping the connecting lines is configured in a particularly simple structural manner if the clip is embodied as a plastically deformable tongue which is fabricated in one piece with the sheet metal of the molded component.

In order to further simplify the mounting of the connecting element according to the invention, it is beneficial if the molded component has a securing element for supporting a spring element which prestresses the carbon brush.

The connecting element according to the invention is particularly space-saving if the spring element is embodied as a torsion spring. The torsion spring is preferably embodied here as a helical spring or as a leg spring.

The connecting element according to the invention can firstly be prepared for the single poles of the electric motor and then for all the poles of the electric motor if two structural units of the molded components each with one of the connecting contacts of the electric motor are connected to one another via an electrical component, preferably a capacitor. This configuration enables the molded components to be fabricated completely from an electrically conductive material without the risk of a short circuit.

According to another advantageous development of the invention, the guiding of the carbon brush is configured in a particularly simple structural manner if the molded component which is fabricated from sheet metal has a plurality of angles for guiding the carbon brush.

According to another advantageous development of the invention, the molded component is mounted in a particularly simple manner if the molded component has latching means for attachment in the receptable.

BRIEF DESCRIPTION OF THE DRAWINGS

The invention permits numerous embodiments. In order to clarify its basic principle further, one embodiment thereof is illustrated in the drawing and will be described below. In said drawing.

FIG. 1 shows a feed unit with a fuel pump 2, driven by an electric motor 1, of a motor vehicle, and with a connecting element 4 which is attached to a housing 3. The connecting element 4 has a connector 5 for a forward-flow line which leads to an internal combustion engine of the motor vehicle. Furthermore, the connecting element 4 has a connecting contact 6 for the electric motor 1. The connecting contact 6 is arranged on a molded component 7 which is attached in a receptacle 8 of the connecting element 4. FIG. 1 shows only a single molded component 7 and a single connecting contact 6. A second connecting contact and a second molded component for a second pole of the electric motor 1 are covered by the connecting contact 6 which is illustrated.

FIGS. 2 and 3 show, in highly magnified, perspective views of opposite sides of the molded component 7, that the connecting contact 6 is fabricated in one piece with the molded component 7. The molded component 7 has a guide 9 for a carbon brush 10 of the electric motor 1 which is illustrated in FIG. 1 and a securing element 11 for supporting a torsion spring 12 which prestresses the carbon brush 10. Furthermore, the molded component 7 is connected to electrical components 13, 14, such as a capacitor and a reactor. Connecting lines 15, 16 of the carbon brush 10 and of the electrical components 13, 14 are clamped tight to clips 17, 18 of the molded component 7. The clips 17, 18 have, for this purpose, plastically deformable tongues 19, 20 which are fabricated in one piece with the molded component 7. The molded component 7 is formed from sheet metal and has a plurality of angles 21 for guiding 9 the carbon brush 10. Furthermore, the molded component (7) has latching means (22) for mounting it in the receptacle (8) of the connecting element (4) which is illustrated in FIG. 1.

FIG. 4 shows two molded components 7, 7a which are premounted for mounting in the connecting element 4 from FIG. 1 and each have the connecting contact 6, 6a and a carbon brush 10, 10a. The two molded components 7, 7a are connected to one another by means of the electrical component 13 which is embodied as a capacitor, and are held spaced apart from said component 13.

Figure 1:
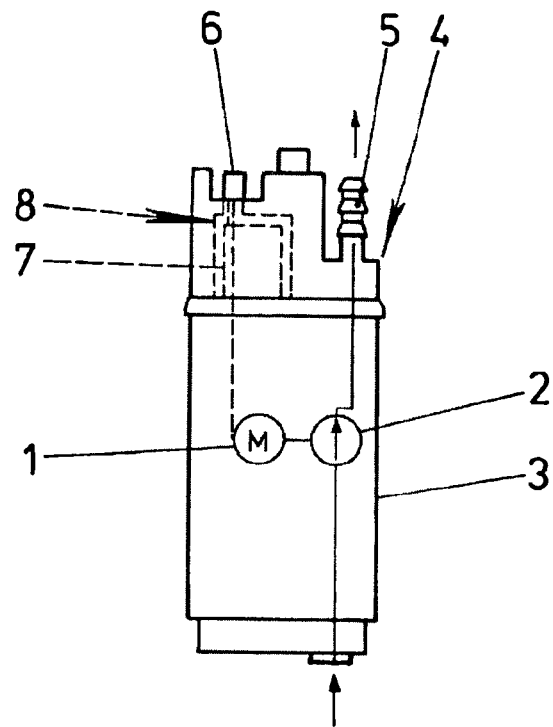
FIG. 1 is a schematic view of a fuel pump with a connecting element according to the invention.
Figure 2:
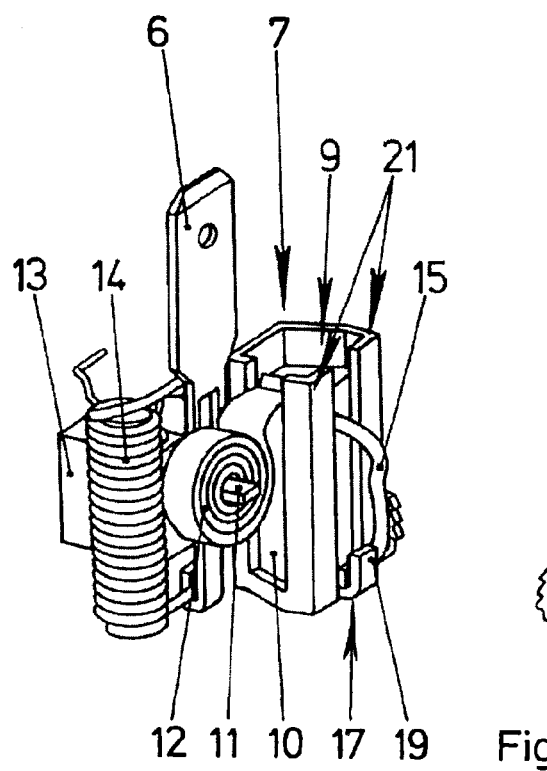
FIGS. 2, 3 show a molded component of the connecting element according to the invention from FIG. 1 in various perspective views.
Figure 3:
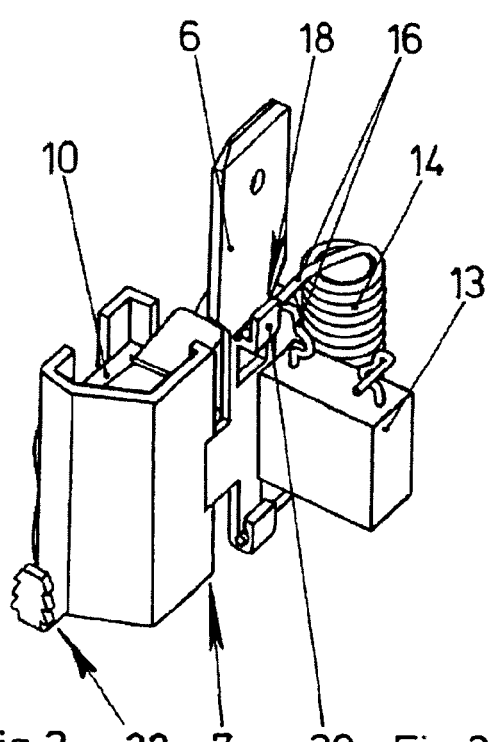
Figure 4:
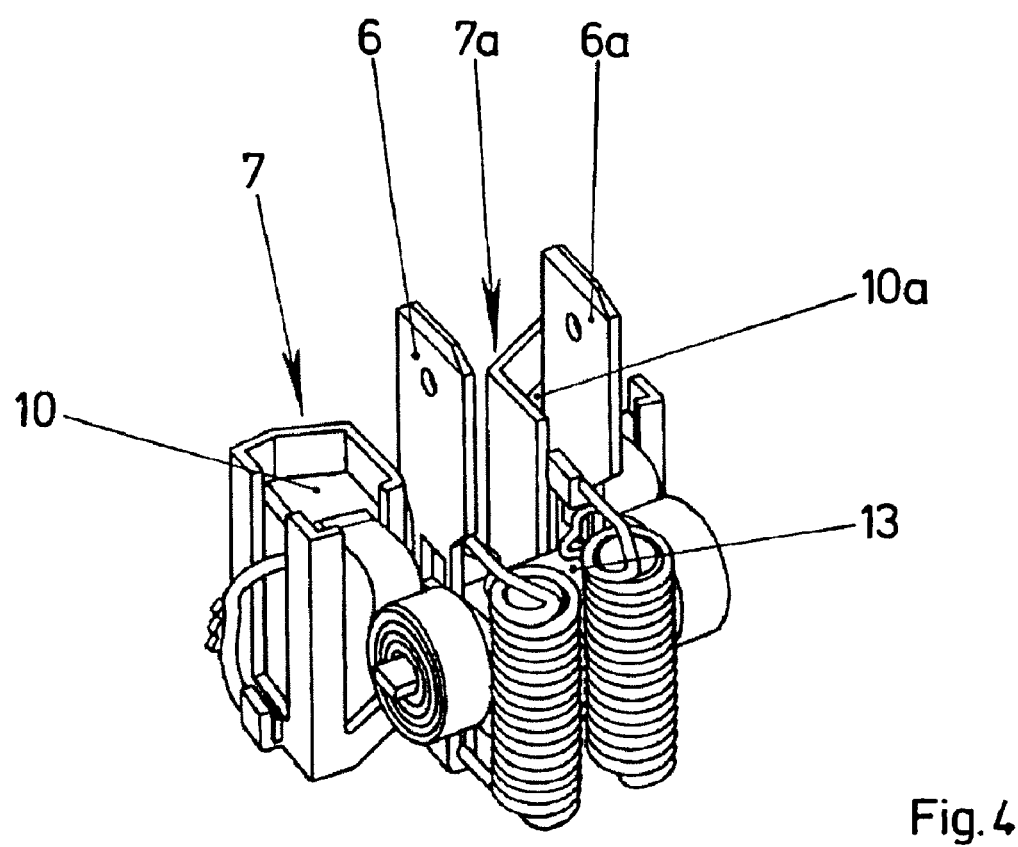
FIG. 4 shows two molded components which are premounted for mounting in the connecting element according to the invention.

What is claimed is:

1. A connecting element for an electric motor, in particular for an electric motor of a fuel feed unit of a motor vehicle having at least one connecting contact for connecting the electric motor to a power source, and having two carbon brushes of the electric motor comprising a fabricated component constructed of sheet metal or electrically conductive plastic, wherein the component defines a single unit for holding the carbon brushes and wherein the component includes connecting contacts that are fabricated integrally therewith; and a clip mounted on the fabricated component for clamping connecting lines of electronic components and the carbon brushes.

2. The connecting element as defined in claim 1, wherein the clip is embodied as a plastically deformable tongue which is fabricated in one piece with the sheet metal of the fabricated component.

3. The connecting element as defined in claim 1, wherein the fabricated component has a securing element for supporting a spring element which prestresses the carbon brush.

4. The connecting element as defined in claim 3, wherein the spring element is embodied as a torsion spring.

5. The connecting element as defined in claim 1, wherein two structural units of the fabricated components each with one of the connecting contacts of the electric motor are interconnected by a capacitor.

6. The connecting element as defined in claim 1, wherein the fabricated component has latching means for attachment in a mounting receptacle.

* * * * *